United States Patent
Hsu et al.

(10) Patent No.: US 12,445,034 B2
(45) Date of Patent: Oct. 14, 2025

(54) POWER SUPPLY SYSTEM AND OPERATING METHOD THEREOF

(71) Applicant: Coretronic Corporation, Hsin-Chu (TW)

(72) Inventors: Shan-Cheng Hsu, Hsin-Chu (TW); Tung-Min Lee, Hsin-Chu (TW); Ying-Chieh Yeh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 207 days.

(21) Appl. No.: 17/900,839

(22) Filed: Aug. 31, 2022

(65) Prior Publication Data

US 2023/0098886 A1 Mar. 30, 2023

(30) Foreign Application Priority Data

Sep. 29, 2021 (CN) .......................... 202111149522.4

(51) Int. Cl.
*H02M 1/32* (2007.01)
*H02J 9/00* (2006.01)
*H02M 1/00* (2006.01)

(52) U.S. Cl.
CPC ........... *H02M 1/0032* (2021.05); *H02J 9/005* (2013.01); *H02M 1/322* (2021.05)

(58) Field of Classification Search
CPC ... H02M 1/322; H02M 1/0032; H02M 1/0048
See application file for complete search history.

(56) References Cited

U.S. PATENT DOCUMENTS

| 2014/0036561 | A1* | 2/2014 | Sakurai | H02M 7/06 363/126 |
| 2016/0226371 | A1* | 8/2016 | Tsou | H02M 1/32 |
| 2020/0127570 | A1* | 4/2020 | Thiele | H02M 3/158 |
| 2022/0320889 | A1* | 10/2022 | Ono | H02J 7/007184 |

FOREIGN PATENT DOCUMENTS

| CN | 108599125 | 9/2018 |
| JP | 2008253105 | 10/2008 |
| TW | I382626 | 1/2013 |

OTHER PUBLICATIONS

"Office Action of China Counterpart Application", issued on Aug. 23, 2025, p. 1-p. 7.

* cited by examiner

*Primary Examiner* — Alex Torres-Rivera
(74) *Attorney, Agent, or Firm* — JCIPRNET

(57) ABSTRACT

A power supply system and operating method thereof are provided. The power supply system includes a power generation circuit and a discharge circuit. The power generation circuit is configured to provide an output voltage at an output end when a power is started, and stop providing the output voltage when the power is off. The discharge circuit includes a capacitor, a comparison circuit, and a switch circuit. The comparison circuit is configured to compare a voltage at a detection end and the output voltage at the output end to generate a comparison result. The switch circuit is configured to discharge the output end according to the comparison result when the power is off. The power supply system and an operating method thereof provided by the disclosure can reduce loss when the power is off, so as to improve the operation quality of the circuit.

8 Claims, 3 Drawing Sheets

POWER SUPPLY SYSTEM AND OPERATING METHOD THEREOF

CROSS-REFERENCE TO RELATED APPLICATION

This application claims the priority benefit of China application serial no. 202111149522.4, filed on Sep. 29, 2021. The entirety of the above-mentioned patent application is hereby incorporated by reference herein and made a part of this specification.

BACKGROUND OF THE DISCLOSURE

Field of the Disclosure

The disclosure relates to a power supply technology, and particularly relates to a power supply system and an operating method thereof.

Description of Related Art

With the development of the technology industry, there is an increasing demand for energy-saving electronic products, and a higher restriction has been set for power wastage in the standby mode of electronic products. Specifically, in conventional power supply systems, in the standby mode, normally a discharge circuit is used to discharge the charge of the capacitor in the power supply to reduce the loss of the circuit during the standby mode.

In conventional design methods, the designer normally configures a conventional comparator in the discharge circuit to perform corresponding operations. However, the conventional comparator needs to rely on an additional power supply to be able to work, and its inverting input end must also be input with a reference voltage level in order to achieve the comparison function. In this circumstances, the power supply system will additionally increase the loss during the standby mode.

In view of the above, it is an issue for those skilled in the art to find out how to make the power supply system in the standby state to effectively reduce the loss without additional control while being able to effectively reduce the number of components in the circuit.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a power supply system and an operating method thereof, which can effectively reduce loss when the power is off, so as to improve the operating quality of the circuit.

Other purposes and advantages of the disclosure can be further derived from the technical features disclosed in the disclosure.

To achieve one or part or all of the above-mentioned purposes or other purposes, an embodiment of the disclosure provides a power supply system. The power supply system includes a power generation circuit and a discharge circuit. The power generation circuit has an output end, and is configured to provide an output voltage at the output end when a power is started, and stop providing the output voltage when the power is off. The discharge circuit is coupled to the output end and has a detection end. The discharge circuit includes a capacitor, a comparison circuit, and a switch circuit. The capacitor is coupled between the detection end and the reference ground. The comparison circuit is coupled to the detection end and the output end, and is configured to compare a voltage at a detection end and the output voltage at the output end to generate a comparison result. The switch circuit is coupled to the comparison circuit and the output end, and is configured to discharge the output end according to the comparison result when the power is off.

In order to achieve one or part or all of the above purposes or other purposes, an embodiment of the disclosure provides an operating method of a power supply system. The power supply system includes a power generation circuit having an output end and a discharge circuit having a detection end. The discharge circuit includes a capacitor, a comparison circuit, and a switch circuit. The capacitor is coupled to the detection end. The operating method includes: providing, through the power generation circuit, an output voltage at the output end when a power is started, and stopping providing the output voltage when the power is off; comparing, through the comparison circuit, a voltage at a detection end and the output voltage at the output end to generate a comparison result; and discharging, through the switch circuit, the output end according to the comparison result when the power is off.

Based on the above, the embodiments of the disclosure have at least one of the following advantages or effects. The power supply system and operating method of the disclosure can charge the capacitor in advance, so that the precharge voltage at the detection end can be used as a basis for starting the discharge mechanism when the power supply system is operating in the power-off state. In this way, compared with the conventional discharge circuit, the discharge circuit of this embodiment does not require additional power supply and control, and can achieve the function of autonomous discharge, thereby reducing the loss when the power is off, and improving the operation quality of the circuit.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected, "coupled," and "mounted," and variations thereof herein are used broadly and encompass direct and indirect connections, couplings, and mountings.

Figure 1:
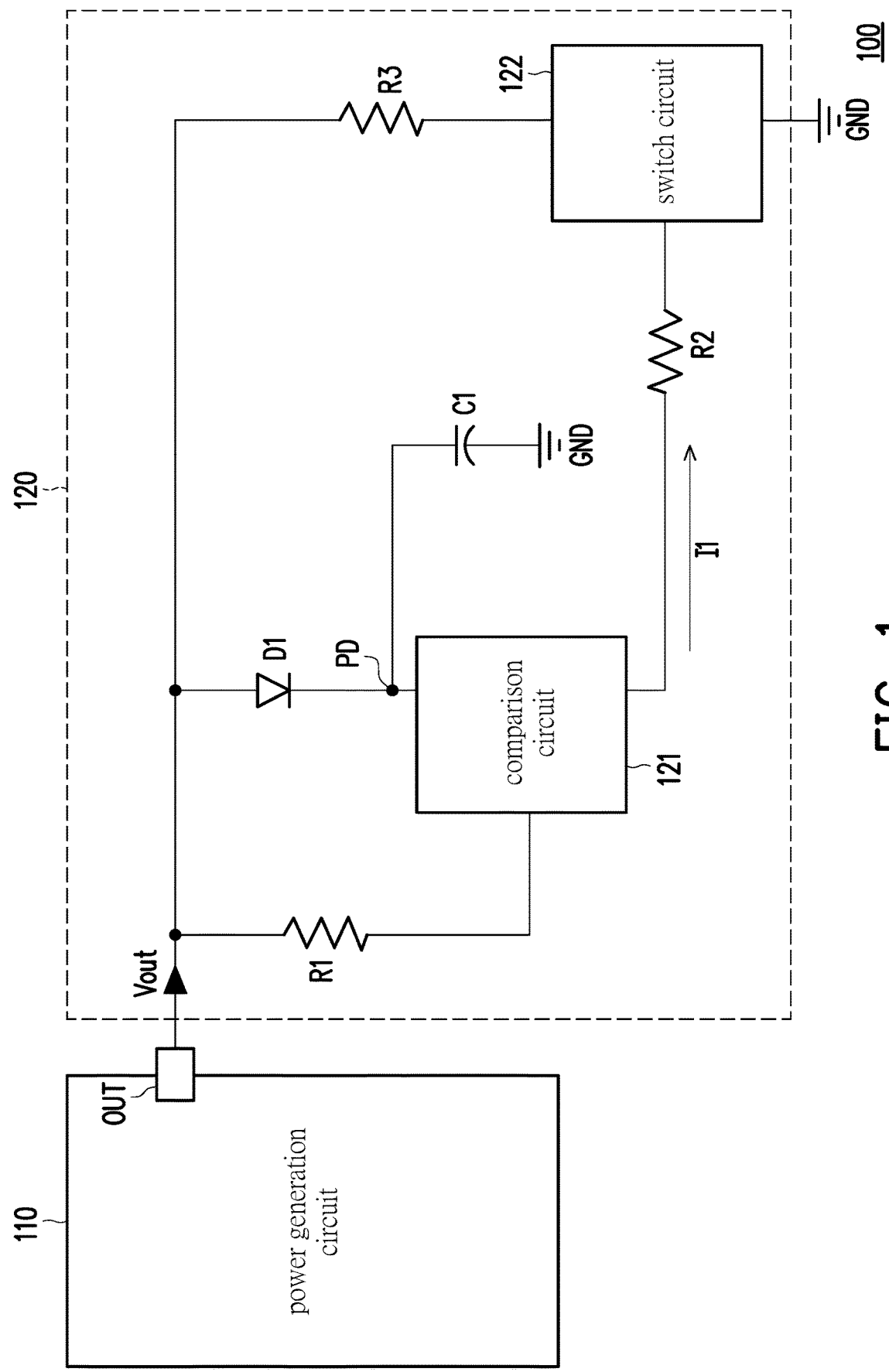
FIG. 1 is a schematic diagram illustrating a power supply system according to an embodiment of the disclosure.

FIG. 1 is a schematic diagram illustrating a power supply system according to an embodiment of the disclosure. Please refer to FIG. 1, in this embodiment, the power supply system 100 includes a power generation circuit 110 and a discharge circuit 120. The power generation circuit 110 has an output end OUT. The power generation circuit 110 can provide the output voltage Vout through the output end OUT when the power is started. In addition, the power generation circuit 110 can also stop providing the output voltage Vout when the power is off.

The discharge circuit 120 is coupled to the output end OUT of the power generation circuit 110. The discharge circuit 120 includes a comparison circuit 121, a switch circuit 122, resistors R1 to R3, a diode D1, and a capacitor C1. The discharge circuit 120 can be configured to discharge the output voltage Vout at the output end OUT when the power generation circuit 110 is operating in the power-off state.

Specifically, in the discharge circuit 120, the anode of the diode D1 is coupled to the output end OUT, and the cathode of the diode D1 is coupled to the detection end PD. The first end of the capacitor C1 is coupled to the detection end PD, and the second end of the capacitor C1 is coupled to the reference ground GND. The first end of the resistor R1 is coupled to the output end OUT, and the second end of the resistor R1 is coupled to the comparison circuit 121. The comparison circuit 121 is coupled to the detection end PD and the second end of the resistor R1. The first end of the resistor R2 is coupled to the comparison circuit 121, and the second end of the resistor R2 is coupled to the switch circuit 122. The first end of the resistor R3 is coupled to the output end OUT, and the second end of the resistor R3 is coupled to the switch circuit 122. The switch circuit 122 is coupled to the second end of the resistor R2, the second end of the resistor R3, and the reference ground GND.

It should be noted that in this embodiment, the comparison circuit 121 of the discharge circuit 120 can generate a comparison result based on the comparison between the voltage at the detection end PD and the output voltage Vout at the output end OUT. For example, when the comparison circuit 121 determines that the voltage at the detection end PD is greater than or equal to the output voltage Vout at the output end OUT, the comparison circuit 121 can generate the current I1 to the switch circuit 122 according to the comparison result. In contrast, when the comparison circuit 121 determines that the voltage at the detection end PD is less than the output voltage Vout at the output end OUT, the comparison circuit 121 can stop generating the current I1 to the switch circuit 122 according to the comparison result.

Regarding the operation details of the power supply system 100 of the embodiment of FIG. 1, in detail, when the power generation circuit 110 is operated in the power-on state, the diode D1 can be turned on according to the output voltage Vout. In this circumstances, the power generation circuit 110 can precharge the capacitor C1 through the output voltage Vout, so that the voltage level at the detection end PD of the capacitor C1 is precharged to a precharge voltage which is the output voltage Vout minus the voltage value of the forward bias voltage (for example, 0.7V, but not limited thereto) of the diode D1.

Next, in the power-on state, since the voltage at the detection end PD at this time is less than the output voltage Vout at the output end OUT, the comparison circuit 121 can stop generating the current I1 to the switch circuit 122 according to the comparison result, so that the switch circuit 122 is in an off state.

On the other hand, when the power generation circuit 110 is operating in the power-off state, the voltage value of the output voltage Vout generated by the power generation circuit 110 will gradually decrease. Under the circumstances, the diode D1 can be turned off based on the output voltage Vout.

Next, since the power generation circuit 110 has precharged the capacitor C1 when the power is turned on, so that the detection end has the precharge voltage. When the voltage of the output voltage Vout drops below the precharge voltage at the detection end PD, the comparison circuit 121 can generate a current I1 to the switch circuit 122 according to the comparison result, so that the switch circuit 122 can be turned on according to the current I1 and the resistance R2.

Under the circumstances, the switch circuit 122 can discharge the output end OUT according to the comparison result, so that the output voltage Vout can be discharged to the reference ground GND according to the discharge path formed by the resistor R3 and the switch circuit 122.

According to the above description of FIG. 1, it can be obtained that the power supply system 100 of this embodiment can charge the detection end PD of the capacitor C1 in advance, so that the precharge voltage at the detection end PD can be used as the basis for starting the discharge mechanism when the power supply system 100 is operating in the power-off state. In this way, compared with the conventional discharge circuit, the discharge circuit 120 of this embodiment does not require an additional power supply and controller, and can achieve the autonomous discharge function, thereby reducing loss when the power is off, and improving the operation quality of the circuit.

Figure 2:
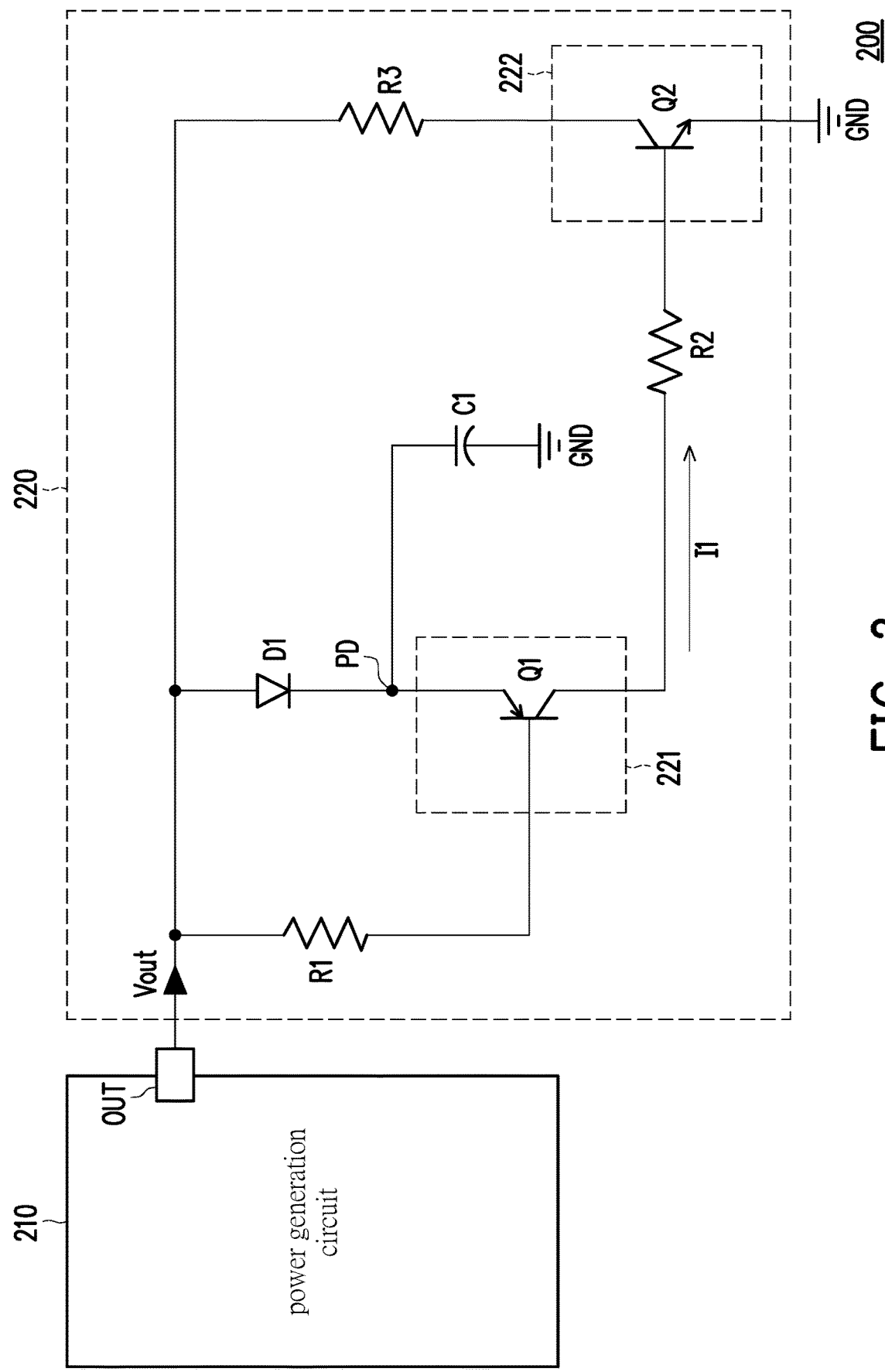
FIG. 2 is a circuit diagram illustrating a power supply system according to another embodiment of the disclosure.

FIG. 2 is a circuit diagram illustrating a power supply system according to another embodiment of the disclosure. Please refer to FIG. 2, in this embodiment, the power supply system 200 includes a power generation circuit 210 and a discharge circuit 220. The discharge circuit 220 includes a comparison circuit 221, a switch circuit 222, resistors R1 to R3, a diode D1, and a capacitor C1. The difference between the embodiment and the embodiment in FIG. 1 is that, in this embodiment, the comparison circuit 221 is composed of a transistor Q1, and the switch circuit 222 is composed of a transistor Q2.

Further, the first end (for example, the emitter end) of the transistor Q1 is coupled to the detection end PD, and the second end (for example, the base end) of the transistor Q1 is coupled to the second end of the resistor R1. The output end (for example, the collector end) of the transistor Q1 is coupled to the first end of the resistor R2. The first end of the transistor Q2 is coupled to the reference ground GND, the second end of the transistor Q2 is coupled to the second end of the resistor R2, and the output end of the transistor Q2 is coupled to the second end of the resistor R3.

It should be noted that, in this embodiment, the transistor Q1 and the transistor Q2 may be a PNP type transistor and an NPN type transistor, respectively. In some other embodiments, the transistor Q1 and the transistor Q2 can also be a P-type metal oxide semiconductor field effect transistor (PMOSFET) and an N-type metal oxide semiconductor field effect transistor (NMOSFET), respectively.

Regarding the operation details of the power supply system 200 of the embodiment of FIG. 2, in detail, when the power generation circuit 210 is operating in the power-on state, the diode D1 can be turned on according to the output voltage Vout. In this circumstances, the power generation circuit 210 can precharge the capacitor C1 through the output voltage Vout, so that the voltage level at the detection end PD of the capacitor C1 is precharged to a precharge voltage which is the output voltage Vout minus the voltage value of the forward bias voltage (for example, 0.7V, but not limited thereto) of the diode D1.

Next, in the power-on state, since the voltage at the first end (i.e., detection end PD) of the transistor Q1 at this time is less than the voltage at the second end of the transistor Q1, the transistor Q1 can stop generating the current I1 to the transistor Q2 according to the voltage difference between the first end and the second end, so that the transistor Q2 is turned off.

On the other hand, when the power generation circuit 210 is operating in the power-off state, the voltage value of the output voltage Vout generated by the power generation circuit 210 will gradually decrease. Under the circumstances, the diode D1 can be turned off based on the output voltage Vout.

Next, since the power generation circuit 210 has precharged the capacitor C1 when the power is on, so that the detection end has the precharge voltage. When the voltage at the second end of the transistor Q1 drops below the precharge voltage at the first end (i.e., the detection end PD) of the transistor Q1, the transistor Q1 can generate a current I1 to the transistor Q2 according to the voltage difference between the first end and the second end, so that the transistor Q2 can be turned on based on the current I1 and the resistor R2.

In this circumstances, the transistor Q2 of the switch circuit 222 can discharge the output end OUT according to the current I1 and the resistor R2, so that the output voltage Vout can be discharged to the reference ground GND according to the discharge path formed by the resistor R3 and the transistor Q2.

In particular, in this embodiment, the resistance value of the resistor R1 is related to the conduction speed of the transistor Q1. The resistance value of the resistor R3 is related to the speed at which the transistor Q2 discharges the output end OUT. For example, when the resistance value of the resistor R3 is larger, the speed at which transistor Q2 discharges the output end OUT is slower, and when the resistance value of the resistor R3 is smaller, the speed at which the transistor Q2 discharges the output end OUT is faster.

Figure 3:
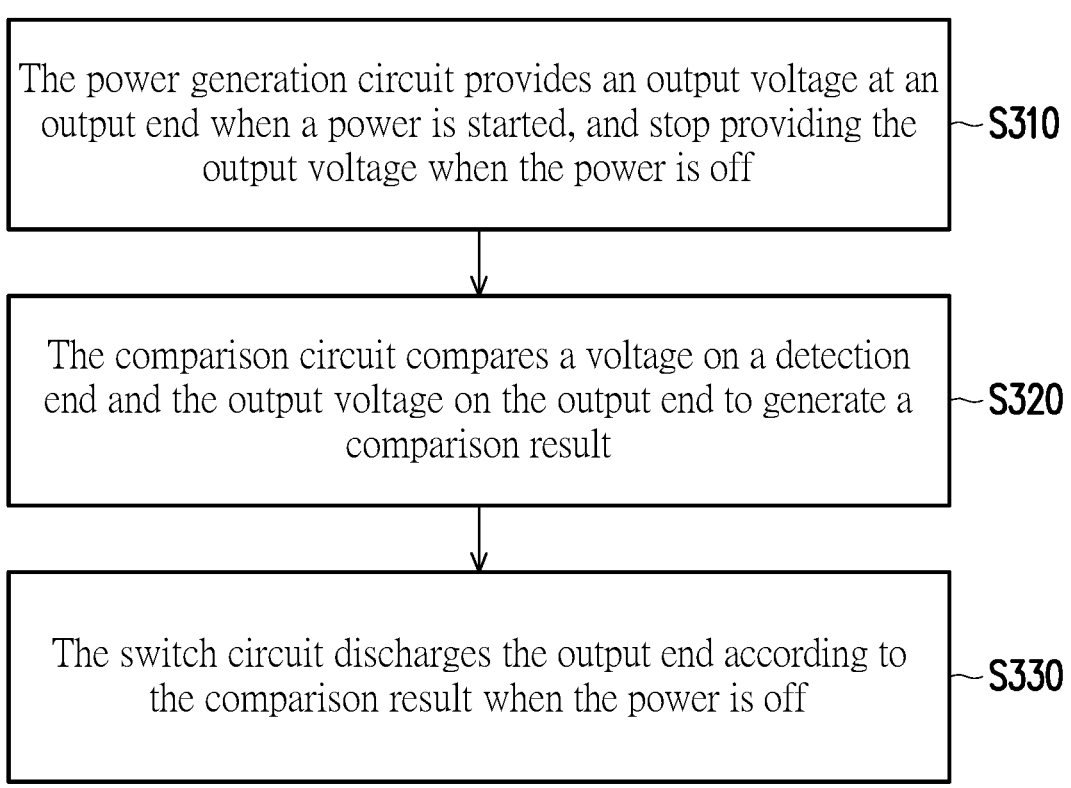
FIG. 3 is a flowchart illustrating the operation of the power supply system shown in FIG. 1 according to an embodiment of the disclosure.

FIG. 3 is a flowchart illustrating the operation of the power supply system shown in FIG. 1 according to an embodiment of the disclosure. Please refer to FIG. 1 and FIG. 3 both. In step S310, the power supply system can provide an output voltage at the output end through the power generation circuit when the power is turned on, and stop providing the output voltage when the power is off. In step S320, the power supply system can compare the voltage at the detection end and the output voltage at the output end through a comparison circuit to generate a comparison result. In step S330, the power supply system can discharge the output end according to the comparison result through the switch circuit when the power is off.

The implementation details of each step are described in detail in the foregoing embodiments and implementation, and no further description is provided herein.

In summary, the embodiments of the disclosure at least have one of the following advantages or effects. The power supply system and the operating method thereof described in the disclosure can charge the capacitor in advance, so that the precharge voltage at the detection end can be used as a basis for starting the discharge mechanism when the power supply system is operating in the power-off state. In this way, compared with the conventional discharge circuit, the discharge circuit of this embodiment does not require an additional power supply and controller, and can achieve the autonomous discharge function, thereby reducing the loss when the power is off, and improving the operation quality of the circuit.

The foregoing description of the preferred embodiments of the disclosure has been presented for purposes of illustration and description. It is not intended to be exhaustive or to limit the exemplary disclosure to the precise form or to embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:
1. A power supply system, comprising:
   a power generation circuit, having an output end, and configured to provide an output voltage at the output end in a power-on state, and stop providing the output voltage in a power-off state; and a discharge circuit, coupled to the output end and having a detection end, wherein the discharge circuit comprises:
  a capacitor, coupled between the detection end and a reference ground;
  a comparison circuit, coupled to the detection end and the output end, and configured to compare a voltage at the detection end and the output voltage at the output end to generate a comparison result; and
  a switch circuit, coupled to the comparison circuit and the output end, and configured to discharge the output end according to the comparison result in the power-off state,
wherein the discharge circuit further comprises:
  a first resistor, coupled between the output end and the comparison circuit;
  a second resistor, coupled between the comparison circuit and the switch circuit; and
  a third resistor, coupled between the output end and the switch circuit,
wherein the comparison circuit comprises:
  a first transistor, comprising a first end coupled to the detection end, a second end coupled to the first resistor, and an output end coupled to the second resistor,
wherein the switch circuit comprises:
  a second transistor, comprising a first end coupled to the reference ground, a second end coupled to the second resistor, and an output end coupled to the third resistor.

2. The power supply system according to claim 1, wherein when the comparison circuit determines that the voltage at the detection end is greater than or equal to the output voltage at the output end, the switch circuit discharges the output end according to the comparison result.

3. The power supply system according to claim 1, wherein the discharge circuit further comprises:
  a diode, having an anode coupled to the output end, and having a cathode coupled to the detection end, wherein, when the power generation circuit is operating in the power-on state, the power generation circuit precharges a voltage level of the detection end of the capacitor to a precharge voltage which is the output voltage minus a voltage value of a forward bias voltage of the diode.

4. The power supply system according to claim 1, wherein a resistance value of the first resistor is related to a conduction speed of the first transistor.

5. The power supply system according to claim 1, wherein a resistance value of the third resistor is related to a speed at which the second transistor discharges the output end.

6. An operating method of a power supply system, the power supply system comprising a power generation circuit having an output end and a discharge circuit having a detection end, the discharge circuit comprising a capacitor, a first resistor, a second resistor, a third resistor, a comparison circuit, and a switch circuit, wherein the capacitor is coupled to the detection end, the first resistor is coupled between the output end and the comparison circuit, the second resistor is coupled between the comparison circuit and the switch circuit, the third resistor is coupled between the output end and the switch circuit, wherein the comparison circuit comprises a first transistor, the first transistor comprises a first end coupled to the detection end, a second end coupled to the first resistor, and an output end coupled to the second resistor, wherein the switch circuit comprises a second transistor, the second transistor comprises a first end coupled to the reference ground, a second end coupled to the second resistor, and an output end coupled to the third resistor, and the operating methods comprises steps of:
  providing, through the power generation circuit, an output voltage at the output end in a power-on state, and stopping providing the output voltage in a power-off state;
  comparing, through the comparison circuit, a voltage at the detection end and the output voltage at the output end to generate a comparison result; and
  discharging, through the switch circuit, the output end according to the comparison result in the power-off state.

7. The operating method according to claim 6, wherein the step of discharging, through the switch circuit, the output end according to the comparison result in the power-off state comprises:
  when the comparison result is that the voltage at the detection end is greater than or equal to the output voltage at the output end, the switch circuit discharges the output end.

8. The operating method according to claim 6, further comprising:
  providing a diode, and when the power generation circuit is operating in the power-on state, the power generation circuit precharges a voltage level of the detection end to a precharge voltage which is the output voltage minus a voltage value of a forward bias voltage of the diode.

* * * * *